(No Model.)
E. THOMSON.
METHOD OF WINDING COILS FOR DYNAMO ELECTRIC ARMATURES.
No. 503,445. Patented Aug. 15, 1893.
Fig. 1.          Fig. 2.
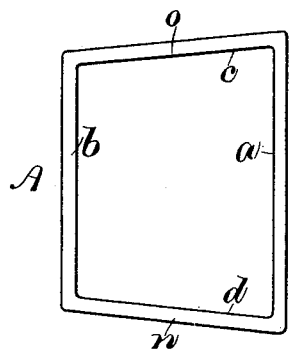 
Fig. 3.          Fig. 4.
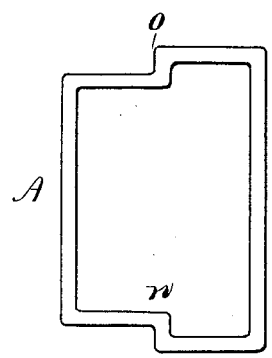 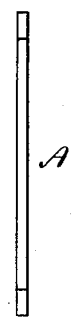
Fig. 5.          Fig. 6.
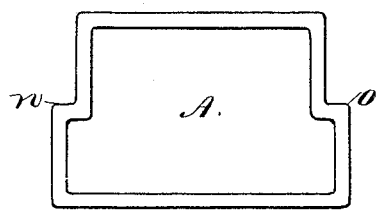 
WITNESSES—
Alec F. Macdonald.
T. J. Johnston.
INVENTOR—
Elihu Thomson
by
Bentley and Blodgett,
Attys.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

METHOD OF WINDING COILS FOR DYNAMO-ELECTRIC ARMATURES.

SPECIFICATION forming part of Letters Patent No. 503,445, dated August 15, 1893.

Application filed April 19, 1893. Serial No. 470,962. (No model.)

*To all whom it may concern:*

Be it known that I, ELIHU THOMSON, a citizen of the United States, and a resident of Swampscott, in the county of Essex and State of Massachusetts, have made certain new and useful Improvements in the Method of Winding Coils for Dynamo-Electric Armatures, of which the following is a specification.

My invention relates to the winding of coils for dynamo electric armatures and has for its object to provide a method of winding such coils which may be economically practiced and which enables me to construct such coils with uniformity and cheapness. To this end I wind the coil upon a form in a trapezoidal shape, and then distort or change the shape of the trapezoid into two incomplete rectangles, as more fully pointed out hereinafter.

In the drawings hereunto annexed and hereby made part of this specification, Figures 1, 3 and 5 are front elevations of coils in the different stages of process of forming; Figs. 2 and 4 are side elevations of the coils shown in Figs. 1 and 3, and Fig. 6 is an end elevation of the completed coil as shown in Fig. 5.

The coil which I design to construct is substantially the same in construction as those shown in the patent to Rudolph Eickemeyer, No. 377,996, February 14, 1888, and is used in the same way; my invention therefore does not reside so much in the coil itself as in the method of manufacture.

A is a coil formed after my invention as illustrated in Fig. 1, and shown just after leaving the former upon which it is wound; this former is of a shape shown by the inner lines of Fig. 1, that is, a trapezoid having the sides $a$, $b$ parallel and the sides $c$, $d$ similarly divergent from the ends of the side $b$. The former is collapsible, as commonly practiced in such operations; and after the coil A is wound upon it the form is collapsed and the coil is withdrawn from it and wrapped with insulating tape or otherwise insulated in a well-known manner. After being withdrawn from the form the sides $c$, $d$ of the coil are bent inward at $n$, $o$ in the manner shown in Fig. 3, so as to convert the trapezoid into a figure composed of two incomplete rectangles, their common sides being missing. After being brought into shape of Fig. 3, the two rectangles are bent into different planes, as illustrated by the end view in Fig. 6, when the coil may be applied to an armature core in well-known ways.

Having thus described my invention, what I claim as new, and desire to protect by Letters Patent of the United States, is—

1. The method of forming a coil for a dynamo electric armature as herein described, which consists in winding a coil on a form into a trapezoidal shape, then removing it from the form, and then distorting or bending the trapezoid into two incomplete rectangles with their common side missing.

2. The method of forming a coil for a dynamo electric armature, which consists in winding the coil upon a form into trapezoidal shape, then removing it therefrom and distorting the trapezoid into two incomplete rectangles, and then bending the rectangles into different planes, substantially as described.

In witness whereof I have hereunto set my hand this 17th day of April, 1893.

ELIHU THOMSON.

Witnesses:
JOHN W. GIBBONEY,
BENJAMIN B. HULL.